United States Patent
Vijayasankar et al.

(10) Patent No.: US 11,722,174 B2
(45) Date of Patent: *Aug. 8, 2023

(54) LONG PREAMBLE AND DUTY CYCLE BASED COEXISTENCE MECHANISM FOR POWER LINE COMMUNICATION (PLC) NETWORKS

(71) Applicant: TEXAS INSTRUMENTS INCORPORATED, Dallas, TX (US)

(72) Inventors: Kumaran Vijayasankar, Allen, TX (US); Ramanuja Vedantham, Allen, TX (US); Tarkesh Pande, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/119,831

(22) Filed: Dec. 11, 2020

(65) Prior Publication Data

US 2021/0194541 A1 Jun. 24, 2021

Related U.S. Application Data

(63) Continuation of application No. 16/552,911, filed on Aug. 27, 2019, now Pat. No. 10,903,875, which is a (Continued)

(51) Int. Cl.
*H04B 3/54* (2006.01)

(52) U.S. Cl.
CPC ....... *H04B 3/54* (2013.01); *H04B 2203/5408* (2013.01); *H04B 2203/5416* (2013.01); (Continued)

(58) Field of Classification Search
CPC .. H04B 3/54; H04B 3/544; H04B 2203/5408; H04B 2203/5416; H04B 3/542; H04B 2203/5433; H04B 2203/5445
See application file for complete search history.

(56) References Cited

U.S. PATENT DOCUMENTS

| | | |
|---|---|---|
| 6,909,723 B1 | 6/2005 | Yonge |
| 7,570,656 B2 | 8/2009 | Raphaeli et al. |

(Continued)

*Primary Examiner* — Sophia Vlahos
(74) *Attorney, Agent, or Firm* — Mandy Barsilai Fernandez; Frank D. Cimino

(57) ABSTRACT

Embodiments of methods and systems for supporting coexistence of multiple technologies in a Power Line Communication (PLC) network are disclosed. A long coexistence preamble sequence may be transmitted by a device that has been forced to back off the PLC channel multiple times. The long coexistence sequence provides a way for the device to request channel access from devices on the channel using other technology. The device may transmit a data packet after transmitting the long coexistence preamble sequence. A network duty cycle time may also be defined as a maximum allowed duration for nodes of the same network to access the channel. When the network duty cycle time occurs, all nodes will back off the channel for a duty cycle extended inter frame space before transmitting again. The long coexistence preamble sequence and the network duty cycle time may be used together.

16 Claims, 6 Drawing Sheets

Related U.S. Application Data continuation of application No. 15/946,041, filed on Apr. 5, 2018, now Pat. No. 10,396,852, which is a continuation of application No. 14/824,506, filed on Aug. 12, 2015, now Pat. No. 9,941,929, which is a continuation of application No. 13/910,125, filed on Jun. 5, 2013, now Pat. No. 9,136,908.

(60) Provisional application No. 61/655,558, filed on Jun. 5, 2012.

(52) U.S. Cl.
CPC .............. *H04B 2203/5433* (2013.01); *H04B 2203/5445* (2013.01)

(56) References Cited

U.S. PATENT DOCUMENTS

| | | | |
|---|---|---|---|
| 7,826,838 | B1 | 11/2010 | Nanda |
| 8,675,651 | B2 | 3/2014 | McFarland et al. |
| 9,136,908 | B2 | 9/2015 | Vijayasankar |
| 10,396,852 | B2 | 8/2019 | Vijayasankar et al. |
| 10,903,874 | B2* | 1/2021 | Vijayasankar ............ H04B 3/54 |
| 2003/0103521 | A1 | 6/2003 | Raphaeli et al. |
| 2005/0063422 | A1* | 3/2005 | Lazar .................... H04B 3/542 |
| | | | 709/200 |
| 2005/0185629 | A1 | 8/2005 | Kuroda et al. |
| 2010/0040091 | A1* | 2/2010 | Kamalizad .......... H04L 27/2665 |
| | | | 370/503 |
| 2011/0043340 | A1 | 2/2011 | Kim et al. |
| 2011/0090067 | A1 | 4/2011 | Kuroda et al. |
| 2012/0093198 | A1 | 4/2012 | Dabak et al. |

\* cited by examiner

LONG PREAMBLE AND DUTY CYCLE BASED COEXISTENCE MECHANISM FOR POWER LINE COMMUNICATION (PLC) NETWORKS

CROSS-REFERENCE TO RELATED APPLICATIONS

This application is a continuation of and claims priority U.S. patent application Ser. No. 16/552,911, filed on Aug. 27, 2019, which is a continuation to U.S. patent application Ser. No. 15/946,041, filed on Apr. 5, 2018 (now U.S. Pat. No. 10,396,852), which is a continuation of and claims priority to U.S. patent application Ser. No. 14/824,506, filed on Aug. 12, 2015 (now U.S. Pat. No. 9,941,929), which is a continuation of and claims priority to U.S. patent application Ser. No. 13/910,125, filed on Jun. 5, 2013 (now issued U.S. Pat. No. 9,136,908), which claims the benefit of the filing date of U.S. Provisional Patent Application No. 61/655,558, which is titled "Long Preamble and Duty Cycle based Coexistence Mechanism for Power Line Communication PLC Networks" and was filed on Jun. 5, 2012, the disclosures of which are hereby incorporated by reference herein in their entireties.

BACKGROUND

Power line communications (PLC) include systems for communicating data over the same medium that is also used to transmit electric power to residences, buildings, and other premises, such as wires, power lines, or other conductors. In its simplest terms, PLC modulates communication signals over existing power lines. This enables devices to be networked without introducing any new wires or cables. This capability is extremely attractive across a diverse range of applications that can leverage greater intelligence and efficiency through networking. PLC applications include utility meters, home area networks, and appliance and lighting control.

PLC is a generic term for any technology that uses power lines as a communications channel. Various PLC standardization efforts are currently in work around the world. The different standards focus on different performance factors and issues relating to particular applications and operating environments. Two of the most well-known PLC standards are G3 and PRIME. G3 has been approved by the International Telecommunication Union (ITU). IEEE is developing the IEEE P1901.2 standard that is based on G3. Each PLC standard has its own unique characteristics.

Using PLC to communicate with utility meters enables applications such as Automated Meter Reading (AMR) and Automated Meter Infrastructure (AMI) communications without the need to install additional wires. Consumers may also use PLC to connect home electric meters to an energy monitoring device or in-home display monitor their energy consumption and to leverage lower-cost electric pricing based on time-of-day demand.

As the home area network expands to include controlling home appliances for more efficient consumption of energy, OEMs may use PLC to link these devices and the home network. PLC may also support home and industrial automation by integrating intelligence into a wide variety of lighting products to enable functionality such as remote control of lighting, automated activation and deactivation of lights, monitoring of usage to accurately calculate energy costs, and connectivity to the grid.

The manner in which PLC systems are implemented depends upon local regulations, characteristics of local power grids, etc. The frequency band available for PLC users depends upon the location of the system. In Europe, PLC bands are defined by the CENELEC (European Committee for Electrotechnical Standardization). The CENELEC-A band (3 kHz-95 kHz) is exclusively for energy providers. The CENELEC-B, C, D bands are open for end user applications, which may include PLC users. Typically, PLC systems operate between 35-90 kHz in the CENELEC A band using 36 tones spaced 1.5675 kHz apart. In the United States, the FCC has conducted emissions requirements that start at 535 kHz and therefore the PLC systems have an FCC band defined from 154-487.5 kHz using 72 tones spaced at 4.6875 kHz apart. In other parts of the world different frequency bands are used, such as the Association of Radio Industries and Businesses (ARIB)-defined band in Japan, which operates at 10-450 kHz, and the Electric Power Research Institute (EPRI)-defined bands in China, which operates at 3-90 kHz.

Different groups of nodes in a PLC network may use different technologies. For example, a first group of nodes may use a first protocol or standard to communicate, and a second group of nodes may use a second protocol or standard to communicate. Although the nodes using the different technologies may not attempt to communicate with each other, they may cause interference with each other on the PLC network. Depending upon the back-off method used in the channel access protocols for each technology, one technology may effectively block the other technology from the channel.

SUMMARY OF THE INVENTION

Embodiments of the invention support coexistence between two similar PLC technologies that rely on preamble detection to access a communication channel. The invention provides fairness to both technologies using a combination of a duty-cycle approach and a long-preamble approach ensures that both PLC technologies share the channel. The duty-cycle approach is non-intrusive in that it does not add to network overhead. The long-preamble approach may be intrusive by impacting network throughput.

In one embodiment, a system and method for supporting coexistence of different technologies on a power line communication network is disclosed. A power line communication device detects a coexistence preamble transmitted from a remote device on a channel in a PLC network. The device determines whether a threshold back-off duration has been reached. The device transmits a coexistence preamble sequence in response to a determination that the threshold back-off duration has been reached. The device may transmit a data frame on the channel after transmitting the coexistence preamble sequence.

The coexistence preamble sequence may comprise two or more repeated coexistence preambles. A size of the coexistence preamble sequence may be selected based upon a maximum packet size for the PLC device. The threshold back-off duration may be defined as a predetermined number N of coexistence Extended Interframe Space (cEIFS) durations for the PLC network.

The device may further determine that a first coexistence preamble sequence has been transmitted on the channel. The device then delays transmission of a second coexistence preamble sequence on the channel for at least a threshold back-off duration.

In another embodiment, a power line communication device monitors a channel occupancy duration during which devices transmit on a channel in a PLC network. The device determines when the channel occupancy duration exceeds a network duty cycle time (ndcTime). The device then backs off from the channel for a duty cycle Extended Interframe Space (dcEIFS) duration when the channel occupancy duration exceeds ndcTime.

The values for the ndcTime and dcEIFS parameters may be selected based upon channel access technologies used by PLC devices on the PLC network. The values of ndcTime and N may be selected so that ndcTime is less than the value of (N×EIFS).

In other embodiments, the value of ndcTime and (N×cEIFS) can be selected to give precedence to a particular approach. For example, ndcTime may be selected as less than N×cEIFS to give precedence to duty cycle approach, or N×cEIFS may be selected as less than ndcTime to give precedence to a long cycle approach.

BRIEF DESCRIPTION OF THE DRAWINGS

Figure 1:
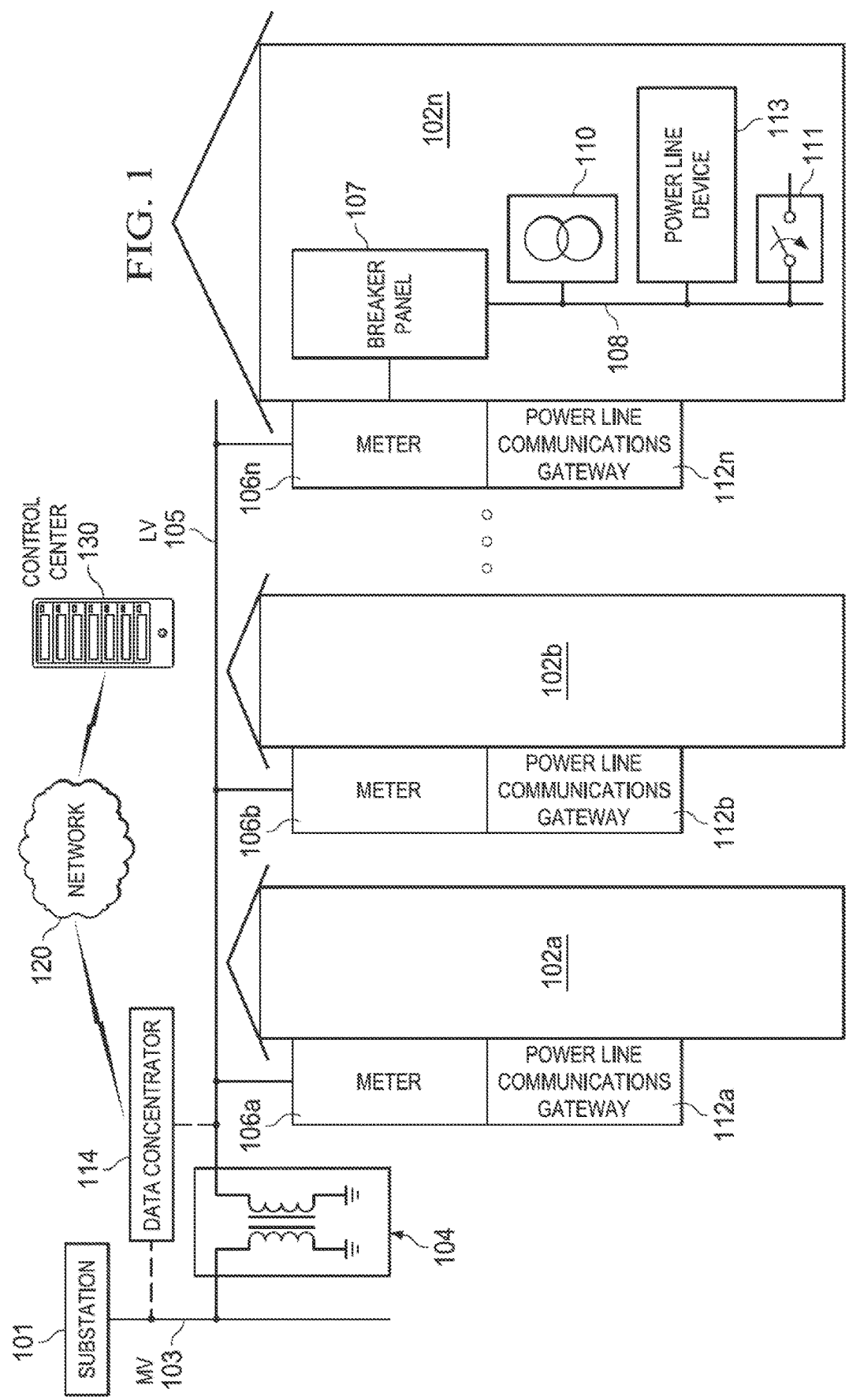

Having thus described the invention in general terms, reference will now be made to the accompanying drawings, wherein:

FIG. 1 is a diagram of a PLC system according to some embodiments.

Figure 2:
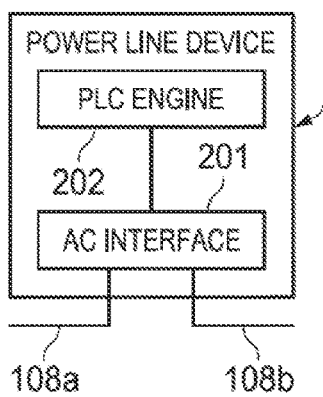

FIG. 2 is a block diagram of a PLC device or modem according to some embodiments.

Figure 3:
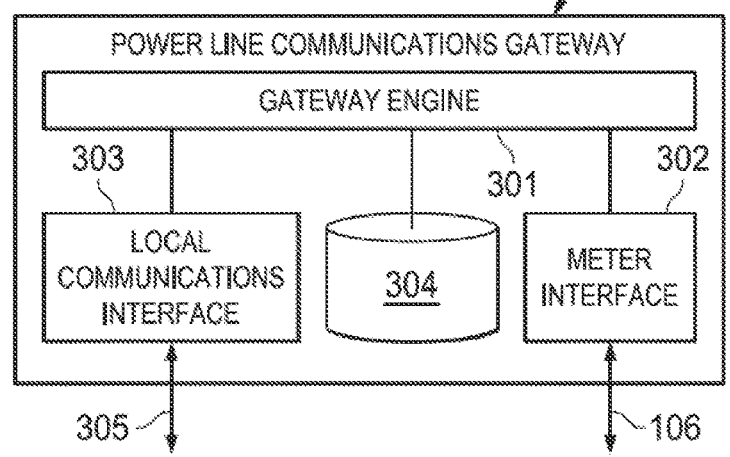

FIG. 3 is a block diagram of a PLC gateway according to some embodiments.

Figure 4:
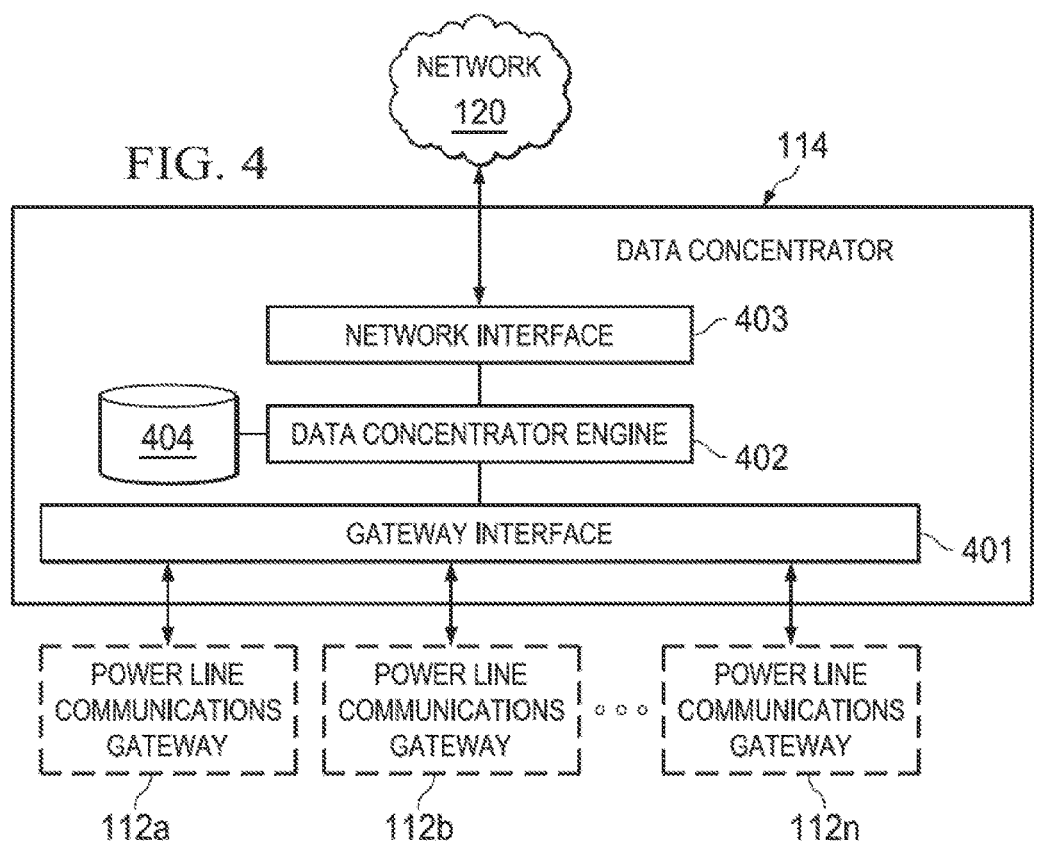

FIG. 4 is a block diagram of a PLC data concentrator according to some embodiments.

Figure 5:
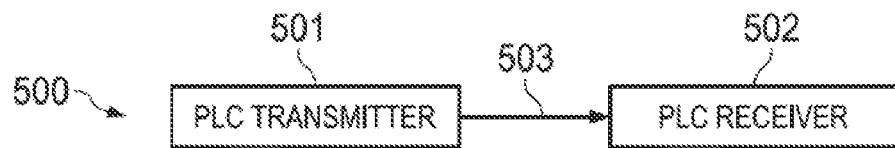

FIG. 5 is a schematic block diagram illustrating one embodiment of a system configured for point-to-point PLC.

Figure 6:
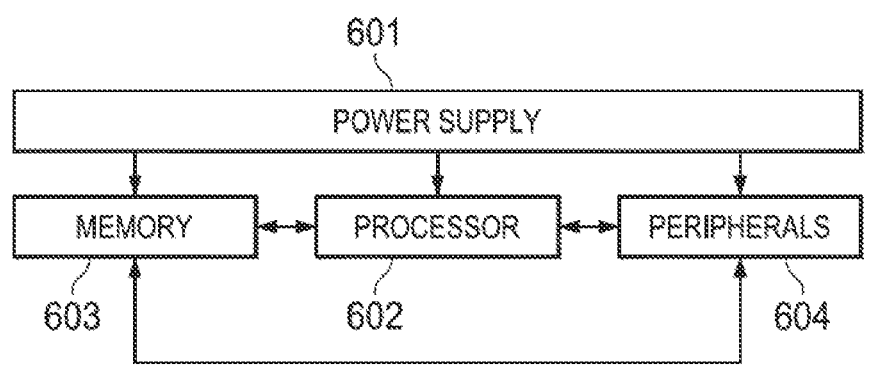

FIG. 6 is a block diagram of an integrated circuit according to some embodiments.

Figure 7:
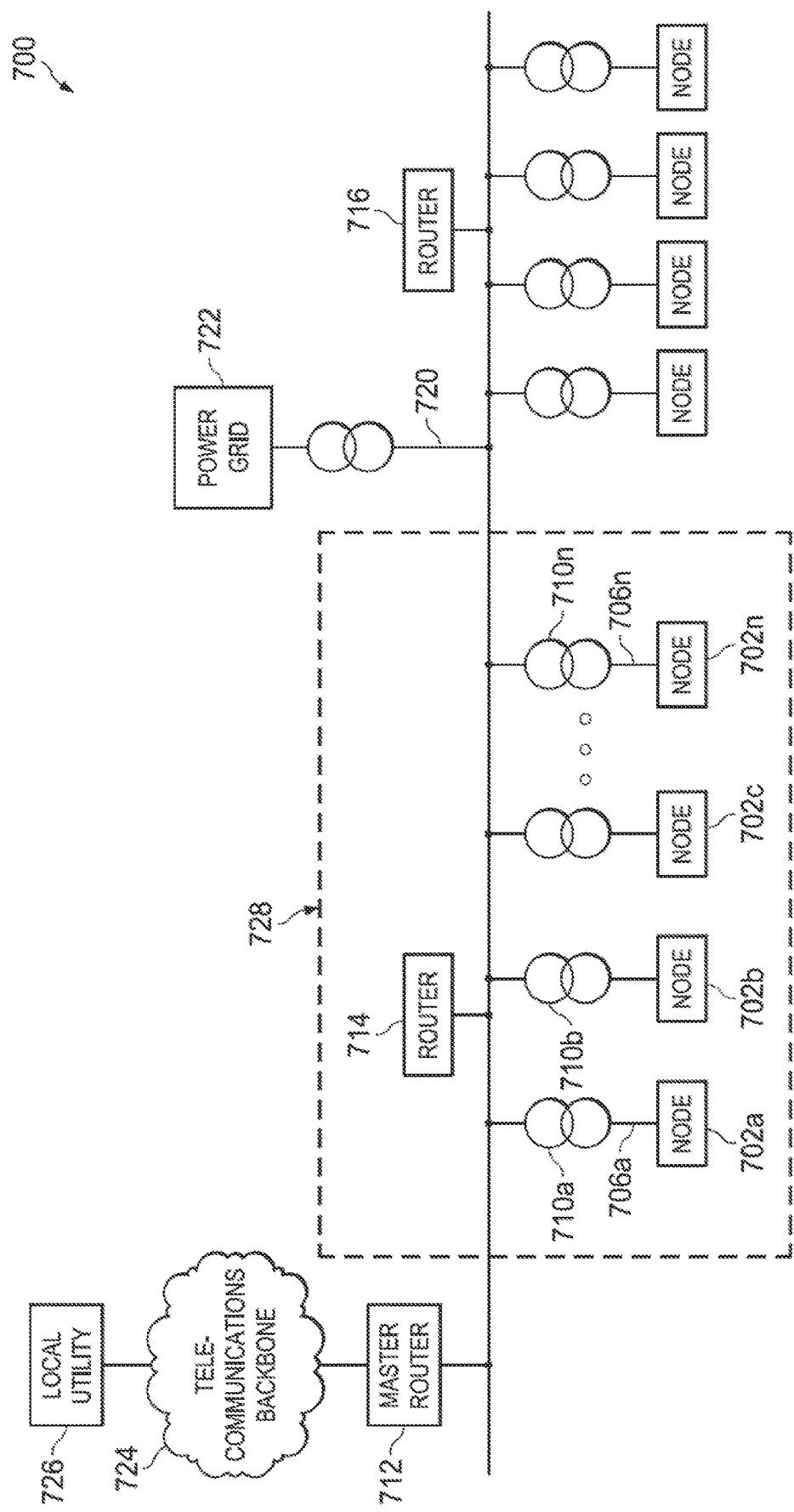

FIG. 7 illustrates an example embodiment of a PLC network for a local utility PLC communications system.

Figure 8:
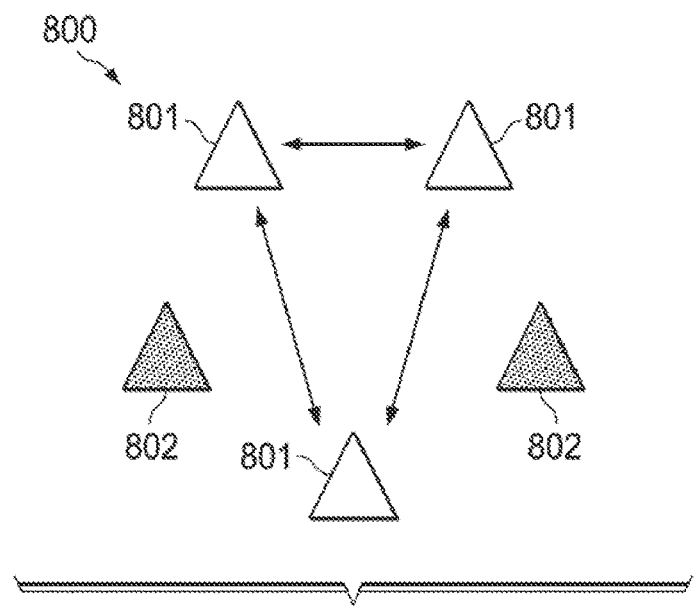

FIG. 8 illustrates a network neighborhood having devices that use two different technology parameters.

Figure 9:
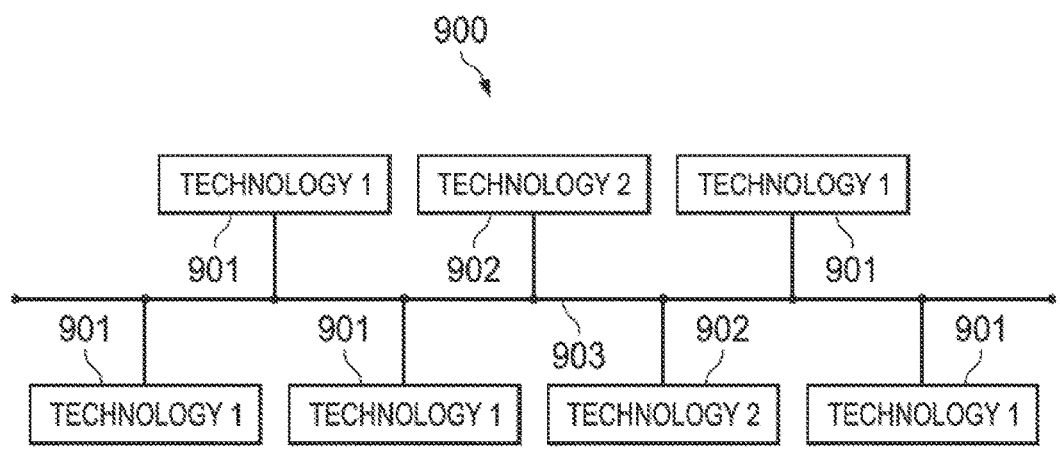

FIG. 9 illustrates an example PLC network having PLC nodes using a first technology and PLC nodes using a second technology.

Figure 10:
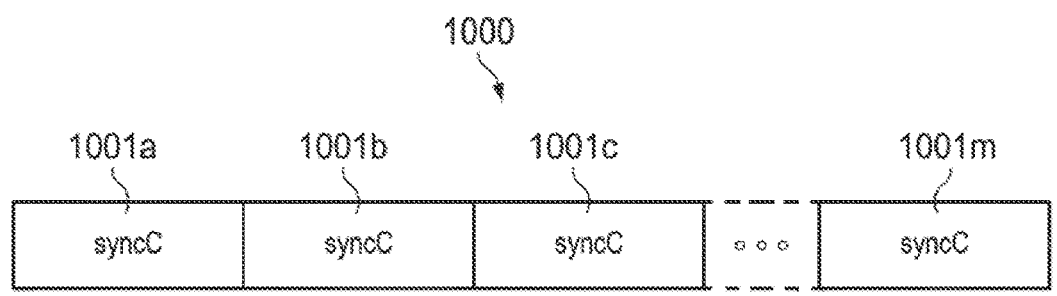

FIG. 10 illustrates a long coexistence preamble sequence according to one embodiment.

Figure 11:
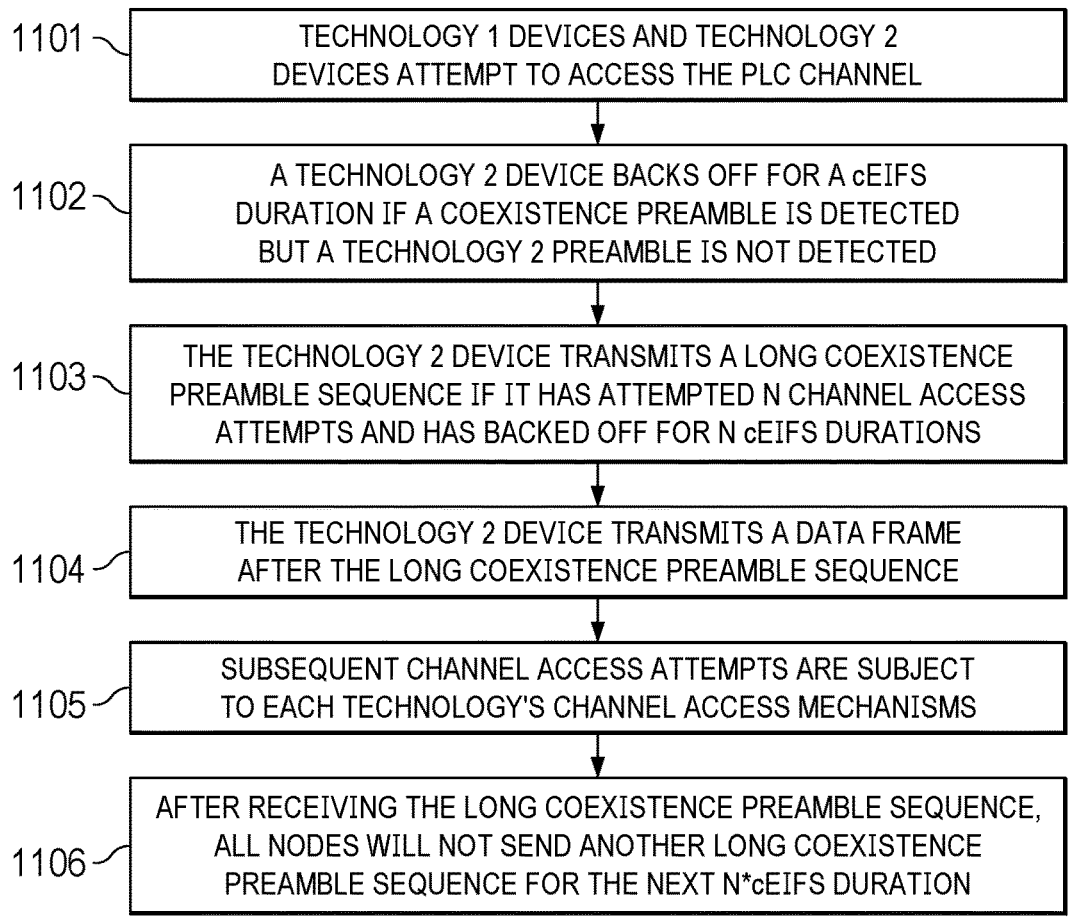

FIG. 11 illustrates an example method that may be used to determine the transmission of a long coexistence preamble sequence.

Figure 12:
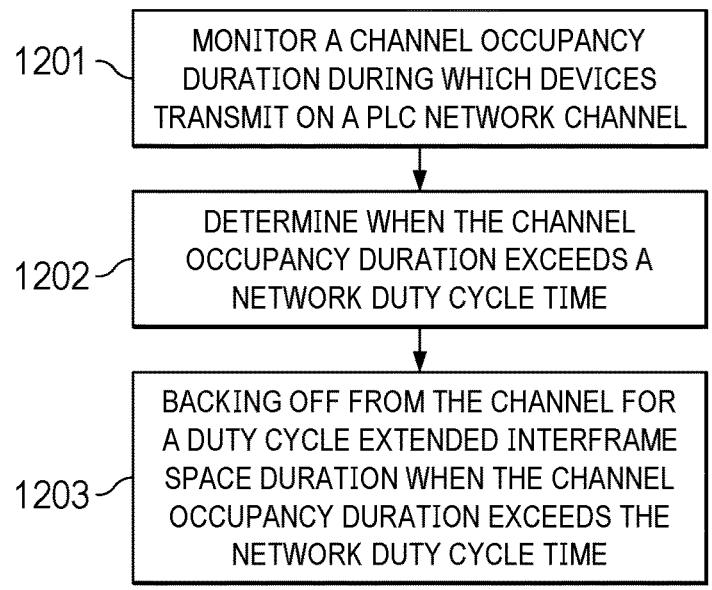

FIG. 12 illustrates a method for using a network duty cycle time by a power line communication device according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 illustrates a power line communication network according to some embodiments. Medium voltage (MV) power lines 103 from subnode 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters or nodes 106a-n, which are typically mounted on the outside of residences 102a-n. Although referred to as "residences," premises 102a-n may include any type of building, facility, electric vehicle charging node, or other location where electric power is received and/or consumed. A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an OFDM technology or the like described, for example, G3-PLC standard.

PLC modems or gateways 112a-n at residences 102a-n use the MV/LV power grid to carry data signals to and from PLC data concentrator or router 114 without requiring additional wiring. Data concentrator or router 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more PLC data concentrators or routers 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

FIG. 2 is a block diagram of PLC device 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZigBee, Bluetooth, Wi-Fi, Wi-Max, Ethernet, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 305 in assigning, allocating, or otherwise managing frequency bands assigned to its various PLC devices.

FIG. 4 is a block diagram of PLC data concentrator or router 114 according to some embodiments. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

FIG. 5 is a schematic block diagram illustrating one embodiment of a system 500 configured for point-to-point PLC. The system 500 may include a PLC transmitter 501 and a PLC receiver 502. For example, a PLC gateway 112 may be configured as the PLC transmitter 501 and a PLC device 113 may be configured as the PLC receiver 502. Alternatively, the PLC device 113 may be configured as the PLC transmitter 501 and the PLC gateway 112 may be configured as the PLC receiver 502. In still a further embodiment, the data concentrator 114 may be configured as either the PLC transmitter 501 or the PLC receiver 502 and configured in combination with a PLC gateway 112 or a PLC device 113 in a point-to-point system 500. In still a further embodiment, a plurality of PLC devices 113 may be configured to communicate directly in a point-to-point PLC system 500 as described in FIG. 5. Additionally, the subnode 101 may be configured in a point-to-point system 500 as described above. On of ordinary skill in the art will recognize a variety of suitable configurations for the point-to-point PLC system 500 described in FIG. 5.

FIG. 6 is a block diagram of a circuit for implementing the transmission of multiple beacon frames using different modulation techniques on each tone mask in a PLC network according to some embodiments. In some cases, one or more of the devices and/or apparatuses shown in FIGS. 1-5 may be implemented as shown in FIG. 6. In some embodiments, processor 602 may be a digital signal processor (DSP), an application specific integrated circuit (ASIC), a system-on-chip (SoC) circuit, a field-programmable gate array (FPGA), a microprocessor, a microcontroller, or the like. Processor 602 is coupled to one or more peripherals 604 and external memory 603. In some cases, external memory 603 may be used to store and/or maintain databases 304 and/or 404 shown in FIGS. 3 and 4. Further, processor 602 may include a driver for communicating signals to external memory 603 and another driver for communicating signals to peripherals 604. Power supply 601 provides supply voltages to processor 602 as well as one or more supply voltages to memory 603 and/or peripherals 604. In some embodiments, more than one instance of processor 602 may be included (and more than one external memory 603 may be included as well).

Peripherals 604 may include any desired circuitry, depending on the type of PLC system. For example, in an embodiment, peripherals 604 may implement local communication interface 303 and include devices for various types of wireless communication, such as Wi-Fi, ZigBee, Bluetooth, cellular, global positioning system, etc. Peripherals 604 may also include additional storage, including RAM storage, solid-state storage, or disk storage. In some cases, peripherals 604 may include user interface devices such as a display screen, including touch display screens or multi-touch display screens, keyboard or other input devices, microphones, speakers, etc.

External memory 603 may include any type of memory. For example, external memory 603 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, DRAM, etc. External memory 603 may include one or more memory modules to which the memory devices are mounted, such as single inline memory modules (SIMMs), dual inline memory modules (DIMMs), etc.

FIG. 7 illustrates an example embodiment of a PLC network 700 for a local utility PLC communications system. Network 700 includes LV nodes 702a-n and each of the nodes 702a-n is connected to MV power line 720 through a corresponding transformer 710a-n and LV line 706a-n. Router, or modem, 714 is also connected to MV power line 720. A sub-network 728, or neighborhood 728, may be represented by the combination of nodes 702a-n and router 714. Master router 712 and router 716 are also connected to MV line 720, which is powered by power grid 722. Power grid 722 represents the high voltage power distribution system.

Master router 712 may be the gateway to telecommunications backbone 724 and local utility, or control center, 726. Master router 712 may transmit data collected by the routers to the local utility 726 and may also broadcast commands from local utility 726 to the rest of the network. The commands from local utility 726 may require data collection at prescribed times, changes to communication protocols, and other software or communication updates.

During UL communications, the nodes 702a-n in neighborhood 728 may transmit usage and load information ("data") through their respective transformer 710a-n to the MV router 714. In turn, router 714 forwards this data to master router 712, which sends the data to the utility company 726 over the telecommunications backbone 724. During DL communications (router 714 to nodes 702a-n) requests for data uploading or commands to perform other tasks are transmitted.

In accordance with various embodiments, nodes 702a-n may be devices using different standards or protocols that operate together in coexistence. In PLC networks where there are several different devices with different technology parameters (e.g., devices using one of IEEE P1901.2 FCC-low band, IEEE P1901.2 CEN-A, and IEEE P1901.2 FCC, G.hnem), a common back-off time for all devices 702a-n in the network-coexistence Extended Inter Frame Space (cEIFS)—may be defined. A device 702n will back-off for a cEIFS interval if the device 702n detects a coexistence preamble but does not detect the device 702n's own native preamble. In one embodiment, cEIFS may be a Personal Area Network (PAN)-specific parameter.

In other embodiments, the system may include devices operating according to different standards or protocols that all communication on FCC-assigned frequencies. For example, the system may include G3 devices that operate according to ITU or IEEE standards, such as IEEE P1901.2. The system may also include devices that operate according to the PRIME standard. The present embodiments may also enable coexistence between these devices.

In a network with devices operating with two or more different technology parameters, devices from one technology may dominate network access.

Table 1 illustrates example band plans that may be used by nodes having different technologies.

TABLE 1

| | Band-Plan | Band-Frequencies |
|---|---|---|
| 1 | IEEE P1901.2 FCC Band | 154.6875 kHz-487.5 kHz |
| 2 | ITU-G3 ARM Band | 154.6875 kHz-403 kHz |
| 3 | ITU-G3 FCC1 Band | 154.6875 kHz-262 kHz |
| 4 | ITU-G.hnem FCC Band | 35 kHz-480 kHz |
| 5 | IEEE P1901.2 FCC Multitone 36-1 | 154.6875 kHz-318 kHz |
| 6 | IEEE P1901.2 FCC Multitone 36-2 | 323 kHz-487.5 kHz |
| 7 | IEEE P1901.2 FCC Low Band | 37.5 kHz-121.875 kHz |
| 8 | IEEE/G3 CEN-A | 35 kHz-90 kHz |
| 9 | PRIME CEN-A | kHz-88.8 kHz |

FIG. 8 illustrates a network neighborhood 800 having devices 801, 802 operating with two different technology parameters. Devices 801 communicate with technology 1 parameters, and devices 802 communicate with technology 2 parameters. It may arise that devices using one technology may dominate network access. For example, communication may be dominated by devices 801 using technology 1 under the following conditions:
 a) if there is a presence of more devices 801 using technology 1 in network neighborhood 800; or
 b) if cEIFS is a large value resulting in the devices 802 using technology 2 continuously backing off.

Although the adaptive back-off scheme in the IEEE P1901.2 standard penalizes a transmitter that wins the channel consecutively for several transmissions by choosing the maximum back-off value, there are still scenarios for which fair channel access mechanisms are required.

In one scenario, fair channel access mechanisms are required when there are multiple transmitters 801 using the same technology in a particular neighborhood 800 compared to few nodes 802 using an alternate technology. In this scenario, nodes 801 (using the same technology) may take turns accessing the channel and consequently will never encounter the state where a particular node 801 gets channel access consecutively. However, it is likely that these several nodes 801 together may have acquired channel access consecutively. Mechanisms are needed to enable the alternate technology nodes 802 to fairly contend for the channel if this scenario is encountered.

In other scenarios, a generic fair channel access methodology is needed to address technologies (e.g., other than IEEE P1901.2) that may not necessarily penalize the winning transmitter after several successful channel accesses. The mechanisms may be agnostic of the underlying channel access mechanism for a specific technology.

FIG. 9 illustrates an example PLC network 900 having PLC nodes 901 using a first technology and PLC nodes 902 using a second technology. As described in connection with FIG. 8, if the technology 1 nodes 901 outnumber the technology 2 nodes 902, then the technology 1 nodes 901 may dominate the channel on power line 903 thereby preventing technology 2 nodes 902 from accessing the channel.

A hybrid solution based upon a combination of a long coexistence preamble and a defined network duty cycle is proposed to address this situation.

Long Coexistence Preamble Approach

A long coexistence preamble sequence may be defined. An example of a long coexistence preamble sequence 1000 is illustrated in FIG. 10. The long coexistence preamble sequence 1000 consists of m repeated preambles (e.g., syncC symbols) 1001a-m. The value of m can be selected such that the long coexistence preamble sequence 1000 is as large as the maximum packet size supported by a selected technology. The syncC symbol may be defined as any appropriate synchronization symbol, such as one or more of the syncP and/or syncM synchronization symbols defined in the IEEE P1901.2 standard. Alternatively, the syncC symbol may be a generic synchronization symbol across different technologies and may correspond to either a chirp signal or known sequence of +/−1's.

FIG. 11 illustrates an example method that may be used to determine the transmission of a long coexistence preamble sequence.

In step 1101, devices using a first technology (technology 1) and a second technology (technology 2) attempt to access a PLC channel using the appropriate access method for their respective technologies.

In step 1102, a device using technology 2 will back off for an additional duration of cEIFS, if the device detects a coexistence preamble and does not detect its native preamble while in cEIFS period.

In step 1103, if a device from technology 2 has attempted to access the channel N times for transmission and has backed off for N cEIFS durations, then the device may transmit a long coexistence preamble sequence, such as the long coexistence preamble sequence 1000 defined above and illustrated in FIG. 10. Transmission of the long coexistence preamble sequence is a way of "requesting" channel access from devices of the different technologies (e.g., technology 1) that are using the channel. The idea here is that if the long coexistence preamble sequence is long enough, then there will be a time slot in which only the long coexistence preamble sequence is present in the channel. This will result in the devices that are using technology 1 to back off (for a cEIFS interval) and thereby "releasing" the channel.

In step 1104, the technology 2 device may transmit a data frame after the long coexistence preamble sequence.

In step 1105, subsequent channel accesses may be subject to each respective technology's channel access mechanisms. For example, technology 1 nodes may contend after the cEIFS duration.

In step 1106, on receiving the long coexistence preamble sequence (e.g., more than 2 coexistence preambles), all service nodes irrespective of the technology used will not send any other long coexistence preamble sequences for the next N×cEIFS. This ensures that there is no more than 1 long coexistence preamble sequence in a sensing region every N×cEIFS.

Duty Cycle

A Network Duty Cycle (ndcTime) parameter may be defined as the maximum allowed duration for nodes of the PLC network to occupy the channel. After the ndcTime, all nodes of that network will backoff the channel for a duty cycle cEIFS (dcEIFS) before being allowed to transmit again. All technologies will have the same dcEIFS.

The ndcTime and dcEIFS parameters may be configurable to allow regional and band settings that best match local requirements.

Note that if the ndcTime duration is on the order of a few transmissions, then there may be a loss in throughput for nodes using one type of technology. On the other hand, if the ndcTime duration is too large, then there may not be a guarantee that nodes using another type of technology will have a transmission to be made during that time. Hence an optimum value should be selected for the ndcTime parameter.

FIG. 12 illustrates a method for using a network duty cycle time by a power line communication device according to one embodiment. In step 1201, a channel occupancy duration is monitored. The channel occupancy duration represents a time during which devices transmit on a channel in a PLC network. In step 1202, the PLC device determines when the channel occupancy duration exceeds a network duty cycle time (ndcTime). In step 1203, the PLC device backs off from the channel for a duty cycle Extended Interframe Space (dcEIFS) duration when the channel occupancy duration exceeds the ndcTime.

Overall Solution

A node may be capable of performing either or both of the above mentioned solutions. Also, it is recommended to choose the ndcTime and N parameters such that ndcTime<N×cEIFS.

It is to be noted that if the duty cycling with ndcTime allows a technology 2 node to get access to channel, then the node will not be needed to transmit a long preamble (i.e., a N×cEIFS time of non-access to channel will not happen).

Also, if even after duty cycling, a technology 2 node does not get access to the channel, then that node will send a long preamble after N×cEIFS.

The values of the ndcTime and N may be selected depending upon the types of technology used by the nodes in the network. The rate at which these solutions are used can be controlled by the choice of these parameters at deployment. At deployment, if it is intended that the duty based solution alone is to be used, then the value of N can be set to a large value. On the other hand, at deployment the duty cycle approach can be disabled by choosing ndcTime>N×cEIFS.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

What is claimed is:

1. A method comprising:
   detecting, by a power line communication (PLC) device associated with a first protocol on a PLC network, a first coexistence preamble;
   waiting, by the PLC device, a back-off duration before attempting a transmission on the PLC network; and
   in response to waiting the back-off duration:
      transmitting, by the PLC device on the PLC network, a long preamble that includes a number of repetitions of a second coexistence preamble, wherein the number of repetitions is determined by the PLC device such that the long preamble is at least as long as a largest packet supported by the PLC network; and
      subsequent to transmitting the long preamble, transmitting a data frame on the PLC network.

2. The method of claim 1, further comprising:
   attempting, by the PLC device, to access a channel on the PLC network.

3. The method of claim 1, further comprising:
   detecting, by the PLC device, a third preamble with the first coexistence preamble and without detecting a native preamble of the PLC device.

4. The method of claim 2, wherein:
for a time duration, the long preamble is the only long preamble on the channel.

5. The method of claim 1, wherein:
the number of repetitions is an integer.

6. The method of claim 1, wherein:
the long preamble includes a synchronization symbol defined in IEEE P1901.2.

7. The method of claim 6, wherein:
the synchronization symbol is based on a chirp signal or a known sequence of +/−1's.

8. The method of claim 1, wherein:
the back-off duration is associated with the first protocol.

9. The method of claim 1, wherein:
the PLC device is associated with a set of technology parameters associated with the first protocol.

10. A power line communication (PLC) system comprising:
a first device associated with a first preamble and configured to communicate using a first protocol of a plurality of protocols, the first device coupled to a PLC network; and
a second device associated with a second preamble and configured to communicate using a second protocol of the plurality of protocols, the second device coupled to the PLC network;
wherein the second device is configured to:
in response to detecting a third preamble and not detecting the second preamble, wait a first duration before accessing the PLC network; and
in response to waiting a number of durations, wherein each of the number of durations is equal to the first duration, transmit on the PLC network the third preamble and a data frame associated with the second protocol.

11. The PLC system of claim 10, wherein:
the first duration is associated with the second protocol; and
the first duration is a coexistence Extended Inter Frame Space (cEIFS).

12. The PLC system of claim 10, wherein the second device is configured to:
determine an occupancy of a channel on the PLC network.

13. The PLC system of claim 10, wherein:
the third preamble includes a synchronization symbol defined in IEEE P1901.2.

14. The PLC system of claim 10, wherein:
the first protocol is one of IEEE P1901.2 FCC-low band, IEEE P1901.2 CEN-A, and IEEE P1901.2 FCC G.hnem;
the second protocol is one of IEEE P1901.2 FCC-low band, IEEE P1901.2 CEN-A, and IEEE P1901.2 FCC G.hnem; and
the first protocol is different than the second protocol.

15. The PLC system of claim 10, wherein:
the third preamble is at least as large as a largest packet associated with the PLC network.

16. A communication device comprising:
a transmitter configured to couple to a power line communication (PLC) network having a maximum packet size; and
circuitry configured to:
detect a first data sequence that includes a first preamble without detecting a native preamble of the communication device;
wait a back-off duration before attempting a transmission; and
in response to waiting the back-off duration, transmit:
a long preamble that includes a number of repetitions of the first preamble, wherein the number of repetitions is selected based on the maximum packet size; and
subsequent to the long preamble, a data frame.

* * * * *